United States Patent [19]
Carder

[11] 3,926,213
[45] Dec. 16, 1975

[54] FLOW CONTROL DEVICE

[76] Inventor: Victor H. Carder, 505 Sausalito Blvd., Sausalito, Calif. 94965

[22] Filed: Dec. 20, 1973

[21] Appl. No.: 426,941

[52] U.S. Cl. ............................................. 137/504
[51] Int. Cl.² ........................................ G05D 7/01
[58] Field of Search .................. 137/501, 504, 503; 251/120; 138/43, 45, 46

[56] References Cited
UNITED STATES PATENTS

| | | | |
|---|---|---|---|
| 2,351,035 | 6/1944 | Grant, Jr. et al. | 137/504 X |
| 3,015,341 | 1/1962 | Hedland et al. | 137/504 X |
| 3,120,243 | 2/1964 | Allen et al. | 137/504 |
| 3,151,628 | 10/1964 | Heckert | 137/504 |
| 3,170,481 | 2/1965 | Presnell | 137/504 |
| 3,285,282 | 11/1966 | Martin | 137/504 |
| 3,381,708 | 5/1968 | Chenoweth | 137/504 |
| 3,422,842 | 1/1969 | Erickson | 137/504 |
| 3,424,196 | 1/1969 | Donner | 137/504 |
| 3,620,249 | 11/1971 | Simmons | 137/503 |

*Primary Examiner*—Martin P. Schwadron
*Assistant Examiner*—Robert J. Miller
*Attorney, Agent, or Firm*—Theodore J. Bielen, Jr.

[57] ABSTRACT

The present invention is concerned with a flow control device operative to change the volumetric flow of liquid in generally inverse relation to changes from a predetermined norm in the supply pressure of such liquid. The device includes a casing having an axially extending chamber therein, and the chamber is provided with both an inlet opening and an outlet opening to enable liquid to flow through the device. A flow control system constituting registerable ports is interposed between the inlet and outlet. A piston axially reciprocable within the chamber between normal-pressure and abnormal-pressure positions traverses the flow control system and ports thereof. The piston provides surface areas oriented to have pressure forces operative in opposite directions thereagainst, one such pressure force being derived from the supply line pressure and the other thereof being derived from the lower pressure resulting from the pressure drop across the piston as the liquid flows from the inlet opening into the chamber of the casing. A helical spring biases the piston toward the normal-pressure position thereof, and a reciprocable spring seat engages such spring and is itself spring biased toward a normal-pressure position. In operation, as the supply line pressure increases from a predetermined norm, the piston is displaced against the biasing force of the spring engaging the same to reduce the effective area of the ports of the flow control system in an effort to maintain the volumetric flow relatively constant, but at the same time the reciprocable spring seat is displaced against the biasing force of the spring engaging the same to relieve the stress on the piston-engaging spring, thereby enabling the piston to be displaced to a greater extent and actually reduce the volumetric flow through the control device.

12 Claims, 9 Drawing Figures

FIG_5

FIG_6

FIG_7

FIG_8

FIG_9

FLOW CONTROL DEVICE

This invention relates to devices for controlling fluid flows and, more particularly, to a flow control device responsive to changes in supply line pressure in a liquid flow system to change the volumetric flow in a particular compensating relationship therewith. In still more specific reference, the invention is concerned with a non-linear pressure compensated flow control device operative to change the volumetric flow of a fluid therethrough in inverse relation to changes from a predetermined norm in the supply pressure of such fluid.

Unless fluid flow systems are regulated in some manner, variations in supply line pressure are accompanied with corresponding changes in the volumetric flow. Accordingly, and within reasonable ranges, as the supply line pressure increases, the volumetric flow through the system correspondingly increases, and vice versa. In flow systems where the supply line pressure is relatively constant and/or pressure and volumetric variations are tolerable, it is common to include a restrictor or orifice, manually adjustable or fixed, in the flow system to provide a predetermined volumetric flow at a particular line pressure, but such arrangements are not pressure compensated and increases in pressure will result in increase flow, and vice versa.

In flow systems requiring a greater degree of refinement, pressure-compensating devices are included which function automatically to provide a relatively uniform flow volume irrespective of fluctuations in supply line pressure. With devices of this type, pressure variations either above or below a predetermined norm have little influence on the volumetric flow since changes are made automatically in response to such pressure variations to maintain the flow rate at a uniform value.

There are instances in which it would be advantageous to change the volumetric flow of fluid through a system in inverse relation to changes from a predetermined norm in the supply line pressure. As an exemplary instance thereof, reference may be made to mechanisms such as conventional forklift trucks that are required to elevate and lower loads that differ in weight one from another over a large range. From a stability and safety standpoint, the heavier loads handled by such vehicle should be elevated and lowered more slowly than lighter loads. At present, such advantages of stability and safety are not provided, and a general object of the present invention is to provide a flow control device for use in fluid flow systems to supply a non-linear pressure compensation in which the flow of fluid through the device and system is varied in an inverse relation to changes in the supply line pressure, decreasing the volumetric flow in response to increases in pressure and vice versa.

Further objects, among others, of the present invention are in the provision of an improved flow control device of the character particularly suited for use in liquid or hydraulic flow systems to provide non-linear pressure compensation therefor in which the volumetric flow of liquid through the device is reduced in relationship to increases in the pressure of the fluid delivered to the device; a device as described that is relatively simple in structural terms, small and compact, and reliable in operation; a device that can be relatively short in axial dimension by arranging certain of the component parts in structural parallelism; a device in which refined control response can be achieved to tailor the same to the requirements of any particular installation by regulatively adjusting the fluid flow and pressure drops that occur through the device, and in which the biasing force of spring structures used in the device can be changed quickly and easily by simple adjustments to attain desired responses; and which device includes a casing structure having an axially extending chamber therein provided with both an inlet opening and an outlet opening and with a flow control system interposed therebetween, a piston reciprocable within the chamber being determinative by appropriate positioning thereof of the permissible volumetric flow through the control port system and being responsive to pressure forces of variable magnitude in accordance with changes in supply line pressure, and also being responsive to spring forces tending to urge the piston toward a normal-pressure position thereof, provision being included in the device to alter the location of a spring seat structure in accordance with changes in supply line pressure so as to effect a non-linear or inverse response in the volumetric flow to changes in the supply line pressure.

Additional objects and advantages of the invention, especially as concerns particular features and characteristics thereof, will become apparent as the specification continues.

Embodiments of the invention are illustrated in the accompanying drawings, in which.

Figure 1:
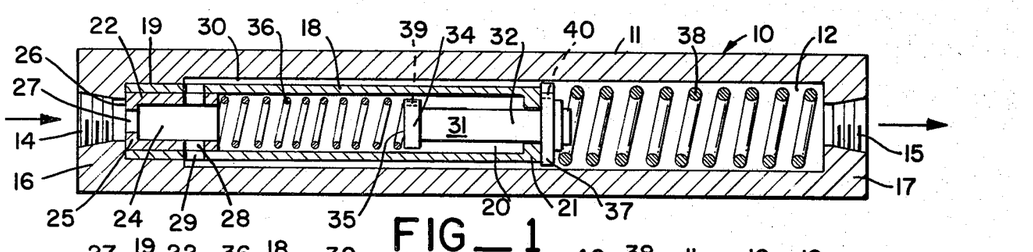
FIG. 1 is a longitudinal sectional view taken along the axis of a flow control device embodying the present invention and illustrating the same with the component parts in the normal-pressure positions thereof.
Figure 2:
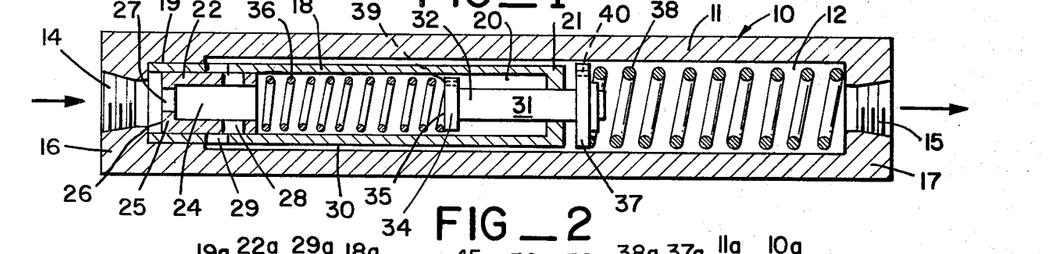
FIG. 2 is a longitudinal sectional view, similar to that of FIG. 1, but illustrating the device with its component parts in abnormal-pressure positions thereof.

The flow control device illustrated in FIGS. 1 and 2 is denoted in its entirety with the numeral 10, and it is operative to change the volumetric flow of a fluid therethrough in inverse relation to changes from a predetermined norm in the supply pressure of such fluid. The device 10 includes an axially elongated casing structure 11 defining an axially extending chamber 12 therewithin having both an inlet opening 14 and an outlet opening 15 communicating therewith. In the embodiment of the invention shown in FIGS. 1 and 2, the inlet and outlet openings are axially spaced and are respectively provided in transverse end walls 16 and 17, respectively, forming a part of the casing structure 11. The openings 14 and 15 may be threaded, as shown, to enable fluid flow conduits to be respectively connected therewith.

The device 10 includes an axially extending sleeve 18 mounted within the chamber 12 and extending therealong from adjacent the inlet opening 14 to about the center portion of the casing structure 11. In this respect, the chamber 12, which may be cylindrical in cross section, has an inwardly stepped section 19 of reduced cross section into which the sleeve 18 seats and is constrained in position thereby with its axis in substantial coincidence with the longitudinal axis of the device 10. Any conventional means may be employed to fixedly relate the sleeve 18 to the casing section 19 as, for example, a press or sweat fit.

The sleeve 18 is open at the end thereof adjacent the inlet 14, and at its opposite end within the chamber 12 it has a transverse wall 21. Otherwise, the sleeve 18 is essentially hollow and defines a compartment 20 of generally cylindrical configuration in the form of the device being considered. Mounted within the compartment 20 and therefor within the chamber 12 is a piston 22 that is axially reciprocable between normal-pressure and abnormal-pressure positions respectively illustrated in FIGS. 1 and 2. The normal-pressure position of the piston 22, as is seen in FIG. 1, is in substantial abutment with the end wall 16 of the casing structure 11; and abnormal-pressure positions of the piston are spaced axially therefrom, as is evident in FIG. 2. The piston 22 is essentially cylindrical in cross section and is hollow or open substantially from end-to-end thereof to provide a bore 24, and it has an end wall 25 having a surface area 26 disposed in pressure-receiving relation with the inlet opening 14 so as to have a pressure force developed thereagainst, as will be explained in detail hereinafter.

The piston 22 has a port or aperture 27 in the end wall 25 thereof in substantial axial alignment with the inlet opening 14, and the port 27 is adapted to pass fluid from the inlet opening into the bore 24. The device 10 is provided with a flow-control port system that includes a plurality of ports 28 in the piston 22 adjacent the open inner end thereof, and it further includes a plurality of ports 29 in the sleeve 18 adjacent the stepped section 19 of the casing structure 11 so as to open directly into the annular space or chamber 30 circumjacent the sleeve 18 and forming a part of the aforementioned chamber 12. The piston 22 is disposed in traversing relation with the sleeve ports 29, and in the normal-pressure position of the piston 22, the ports 28 thereof respectively align with the ports 29 in the sleeve 18, as shown in FIG. 1. Displacement of the piston 22 toward an abnormal-pressure position thereof, as illustrated in FIG. 2, tends to effect misalignment of the piston ports 28 and sleeve ports 29, thereby inhibiting fluid flow from the interior of the piston, through the ports 28 and 29, and into the annular space 30.

The device 10 further includes a spring seat structure 31 axially reciprocable within the chamber 12 generally between normal-pressure and abnormal-pressure positions. The seat structure 31 has an axially extending stem 32 that slidably extends through an opening provided therefor in the end wall 21 of the sleeve 18. The stem 32 adjacent the end thereof within the compartment 20 is equipped with a spring seat 34 having a pressurizable surface 35 spaced from the piston 22 and forming a pressurizable space therewith that communicates with the inlet opening 14 via the bore 24 and aperture 27, and that contains a helical compression spring 36 seating at one end against the pressurizable surface 35 and at its other end against the piston 22. The spring 36 constitutes means operative between the seat structure 31 and piston 22 to bias the latter toward the normal-pressure position thereof illustrated in FIG. 1.

Adjacent its opposite end on the exterior of the sleeve 18, the stem 32 is equipped with a combination spring seat and stop or abutment element 37 that establishes the normal-pressure position of the seat structure 31 upon abutment with the surface of the sleeve end wall 21, as shown in FIG. 1. The seat structure 31 is resiliently biased toward such normal-pressure position thereof by spring structure 38 in the form of a helical compression spring that seats at one end against the element 37 and at its other end against the end wall 17 of the casing structure 11. The biasing force of the spring 38 is superior in magnitude to the biasing force of the spring 36 so that the element 37 of the seat structure 31 is urged into abutment with the sleeve end wall 21 during normal-pressure conditions of the device 10. The spring-seat elements 34 and 37 are respectively provided with bleed passageways 39 and 40, respectively, therethrough to prevent pressure buildup intermediate such elements and the end wall 21 of the sleeve during reciprocable displacement of the seat structure.

Figure 4:
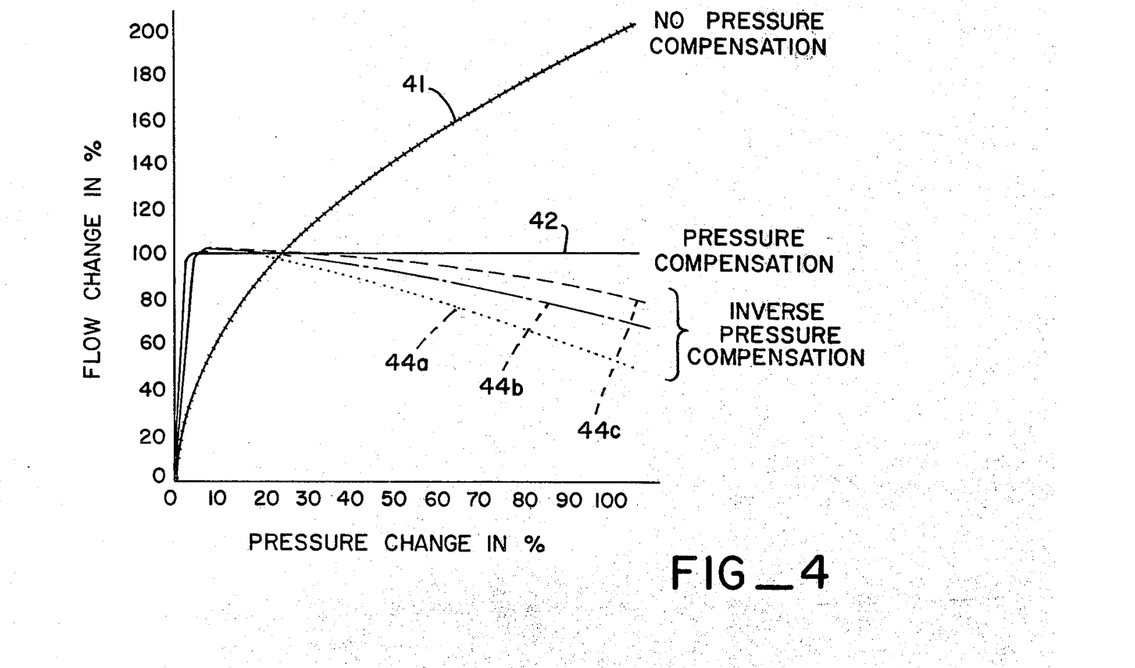
FIG. 4 is a graph illustrating the volumetric flow characteristics related to changes in the supply pressure of various flow control devices.

Prior to describing a cycle of operation of the device 10 with reference to changes in volumetric flow therethrough in inverse relation to changes in the supply pressure from a predetermined norm, reference will be made to FIG. 4 which depicts typical pressure-flow conditions for various flow systems. In FIG. 4, the intersecting axes of the usual cartesian coordinate system are illustrated, and pressure changes in percent from a predetermined norm are measured along the X-axis or abscissa, and volumetric flow is plotted in percentage of change from a predetermined norm along the Y-axis or ordinant of the system. In some fluid flow systems, the volumetric flow therethrough is established for some predetermined supply pressure by inserting a restrictor or orifice in the flow line. There is no pressure compensation in such systems and the volumetric flow increases in correspondence with increases in the supply pressure, as indicated by the curve 41. It is quite common in flow systems to pressure compensate the same so that the volumetric flow remains relatively constant irrespective of fluctuations in the supply pressure. The operational characteristics of systems of that type are depicted by the curve 42 in FIG. 4 which shows that the volumetric flow rises rapidly to a predetermined norm as the supply line pressure rises to a corresponding norm after which the volumetric flow remains substantially unchanged as the supply pressure changes over a very wide range. The device 10 functions to change the volumetric flow of a fluid therethrough in inverse relation to changes from a predetermined norm in the supply pressure of such fluid, and such relationship is indicated in FIG. 4 by each of the curves 44a, 44b, and 44c. The family of curves 44 respectively depict the device 10 with spring forces of different magnitudes operative with reference to seat structure 31. It will be noted that each of the curves 44 rises rapidly along the abscissa to a predetermined or normal flow rate with a very small change in the supply pressure to bring the same to a corresponding normal value. Thereafter, as the supply pressure rises above such predetermined norm, the volumetric flow is seen to be inversely related to the pressure and therefore diminishes as the pressure increases.

Returning now to the device 10 and considering first the relative orientation of the components as they are shown in FIG. 1, it may be assumed that the device is connected in a fluid flow line which, as a specific instance, may be taken to be the hydraulic flow system by means of which the hoist of a conventional forklift truck elevates and lowers loads of various magnitudes. The device 10 is oriented in such flow system such that the liquid flow enters the device 10 at the inlet opening 14 and exits the same at the outlet opening 15. The relative positions of the components as shown in FIG. 1 may be taken to be the normal-pressure condition in which the volumetric flow through the device 10 is at a predetermined norm or value and the supply line pressure is at a corresponding predetermined value or norm.

In this condition of the device 10, the spring structure 38 is operative between the casing end wall 17 and element 37 of the seat structure 31 to bias the seat element 37 into abutment with the end wall 21 of the sleeve 18, and the spring means 36 is effective to bias the piston 22 into abutment with the end wall 16 of the casing structure 11. The relative magnitudes of the biasing forces provided by the springs 36 and 38 are selected so that this condition tends to be maintained until predetermined normal supply pressures and volumetric flows are obtained, although the spring forces may be selected so that the piston 22 will be displaced slightly from the condition of abutment with the casing end wall 16 during normal-pressure and flow conditions, thereby enabling the volumetric flow to be increased with pressure reductions as well as decreased with pressure increases.

As liquid under pressure enters the inlet opening 14, it meets the pressurizable surface 26 of the piston end wall 25, thereby developing a pressure force thereagainst that tends to displace the piston toward the center of the device 10 against the biasing force of the spring 36. Whether the piston 22 is displaced by such pressure force will depend upon the magnitude thereof in relation to the biasing forces of the springs 36 and 38. In any case, one of the forces to be considered is the pressure force acting against the pressurizable surface 26 of the piston 22. Liquid flows from the opening 14 through the aperture 27 and into the compartment 20 within the sleeve 18 and upon filling the compartment 20, develops a pressure therein of somewhat lower magnitude than the supply line pressure present at the inlet opening 14 because of the pressure drop that occurs through the aperture 27 which is of smaller diameter than that of the inlet opening 14. Liquid within the compartment 20 flows outwardly therefrom through the control ports 28 and 29 and into the annular space 30 from which it flows through the larger portions of the chamber 12 and exits the same through the outlet opening 15. A further pressure drop occurs through the control ports 28 and 29 so that the pressure within the chamber 12 is somewhat less than that within the compartment 20, which, as stated, is less than the supply line pressure.

This flow condition obtains as long as the supply line pressure present at the inlet opening 14 is at or near the norm established therefor, and the volumetric flow leaving the device 10 via the outlet opening 15 is at a corresponding predetermined norm. Other forces active at this time constitute a pressure force developed within the space intermediate the piston 22 and pressurizable surface 35 of the spring seat 34. Such pressure force tends to urge the piston 22 and seat structure 31 in opposite directions, but since the force is of lesser magnitude than the pressure force active in the opposite direction against the piston wall 25 (because of the pressure drop which occurs through the aperture 27) the piston 22 would tend to be displaced toward the right, as viewed in FIGS. 1 and 2, as a consequence of the superior value of the pressure at the inlet opening 14. However, the biasing force imparted to the piston 22 by the spring 36 supplements the pressure force tending to displace the piston toward the left, as viewed in the same figures, thereby causing a condition of equilibrium to be established which, as previously explained, may be one in which the piston 22 is in substantial abutment with the end wall 16 of the casing structure 11.

At the same time, the pressure force within the compartment 20 tends to displace the seat structure 31 toward the right (FIGS. 1 and 2) because the pressurizable surface 35 of the spring seat 34 has a greater area than the opposite surface of the seat 34 because of the presence of the stem 32. This pressure force tending to displace the seat structure 31 toward the right is supplemented by the biasing force of the spring 36, but both are overcome by the superior magnitude of the biasing force provided by the spring 38 which causes the seat structure 31 to assume a position of equilibrium which may be one in which the element 37 is in abutment with the end wall 21 of the sleeve 18, as shown in FIG. 1 and as previously explained.

Assume now the situation in which the supply line pressure rises, the percentage of pressure drop across the aperture 27 remains essentially the same so that the pressure differential between the two pressure forces acting in opposite directions against the piston 22 becomes greater with the superior force being active against the pressurizable surface 26, thereby tending to displace the piston 22 toward the right and into the position illustrated in FIG. 2 in which the control ports 28 and 29 are partially out of register. Taking, for purposes of explanation, the seat structure 31 to be fixed to the sleeve 18, the displacement of the piston 22 toward the right is eventually overcome by the increasing force of the spring 36 which is an ordinary Hooke's law spring in which the biasing force thereof progressively increases with stress. Thus, a new condition of equilibrium for the piston 22 would be established in which the control ports 28 and 29 would be sufficiently out of total registration so that the flow volume therethrough is limited sufficiently to compensate for the increased supply line pressure present at the openings 14 and thereby tend to provide a relatively constant volumetric flow through the outlet opening 15. As the supply line pressure further increased, the piston 22 will be displaced proportionately to the right to further displace the control ports 28 and 29 out of registration; and any reduction in the supply line pressure would cause the piston 22 to be displaced toward the left to more closely effect a condition of registration between the control ports 28 and 29.

In the device 10, however, the seat structure 31 is not fixedly related to the sleeve 18 and is freely displaceable axially relative thereto. As a consequence, any increase in the supply line pressure appearing at the inlet opening 14 will function in the manner described, but the increase in pressure within the compartment 20 and specifically in the space between the piston 22 and seat element 34 will cause a greater pressure force to act against the pressurizable surface 35 of the structure 31, thereby tending to displace it toward the right against the biasing force of the springs 38 and into the position shown in FIG. 2. Such displacement of the seat structure 31 permits the spring 36 to expand, thereby decreasing the biasing force imparted thereby to the piston 22 whereupon the piston is further displaced toward the right because of the superior pressure force acting against the pressurizable surface 26 thereof. These axial displacements of the seat structure 31 and piston 22 will continue until a condition of equilibrium is attained, and such condition of equilibrium will be one in which the control ports 28 and 29 are further misaligned to enhance or increase the pressure drop thereacross and thereby reduce the volumetric flow through the outlet opening 15. Accordingly, the device 10 is responsive in a somewhat non-linear manner to decrease the volumetric flow in accordance with increases in the supply line pressure and thereby define an inverse relationship between volumetric flow and supply line pressure as depicted by the curves 44 in FIG. 4.

The piston 22 and spring seat structure 31 are reciprocably displaced along the axis of the device 10 in accordance with variations in the pressure of the fluid delivered to the inlet opening 14 in order to compensate for changes in such supply pressure so as to adjust the volumetric flow at the outlet port 15 inversely with respect to pressure changes at the inlet port 14. The precise extent to which compensation is effected by the device 10 depends upon the ratios of the forces provided by the springs 36 and 38 which are selected in order to effect a desired response.

The piston 22 always assumes a position of equilibrium enforced thereon by the various oppositely acting pressure and spring forces, and any such position of equilibrium should be one in which the control ports 28 and 29 are in at least partial registration. Assume, however, that the piston 22 is displaced toward the outlet opening 15 to a location in which the control ports 29 are completely closed by the side wall of the piston. Should this occur, a no-flow condition is established and, accordingly, there will be no pressure drop across the orifice 27. As a consequence, the pressure forces acting in opposite directions against the piston 22 will be equal because the active surface areas are the same, and the only unbalanced force acting on the piston will be that supplied by the spring 36. As a result of this unbalanced spring force, the piston 22 will be returned to a position of equilibrium in which the control ports 28 and 29 are at least in partial registration.

Figure 3:
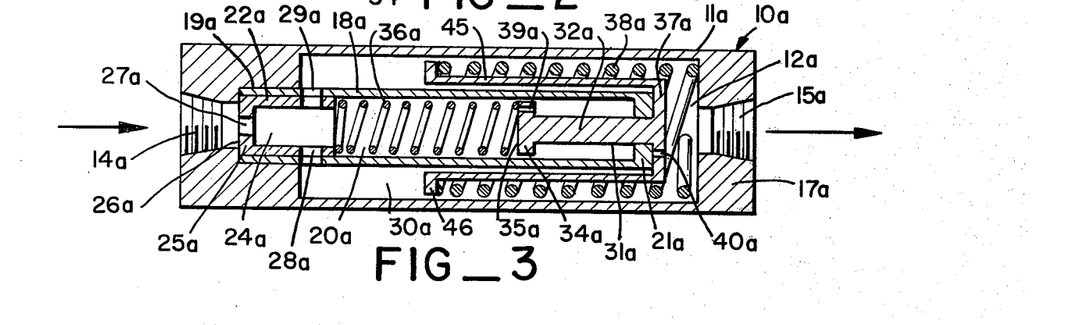
FIG. 3 is a longitudinal sectional view taken along the axis of a modified form of the device in which the axial dimensions thereof have been reduced.

A modified valve structure is illustrated in FIG. 3, and the same numerals are used to identify the parts and elements thereof that respectively correspond to the same parts and elements described with reference to the device 10 except that the suffix a is added to each number in FIG. 3 for purposes of differentiating the device 10a illustrated therein from the device 10 heretofore described. The devices 10 and 10a are substantially identical in terms of function, and they differ one from the other in terms of structure only in the sense that certain of the components in the device 10a are arranged in structural parallelism with other components for the purpose of decreasing the overall length of the device which, with respect to the device 10, has the component parts thereof essentially oriented in structural serialism.

More particularly with reference to the device 10a, the seat structure 31a thereof is provided with a stem 32a extending through an opening provided in the end wall 21a of the sleeve 18a, and the stem is equipped with a seat and abutment element 37a adapted to engage the sleeve wall 21a, as shown in FIG. 3. However, the element 37a is equipped with a hollow collar 45 that extends along the sleeve 18a in coaxial circumjacent relation therewith. At the end of the collar 45 most proximate the inlet opening 14a, it is equipped with a laterally extending flange 46 adapted to seat thereagainst one end of the spring 38a which at its opposite end seats against the wall 17a of the casing structure 11a in the manner previously explained. The spring 38a is relatively large in diameter and is disposed in circumjacent relation with the collar 45, wherefore the collar and spring are in general parallelism in a structural or mechanical sense with a substantial length of the sleeve 18a. Therefore, the overall length of the device 10a is reduced from that of the device 10, but the diameter or transverse dimension of the device 10a may be somewhat larger than that of its counterpart 10.

The modified control device 10a functions in essentially the same manner as the device 10, and provides a volumetric flow at the outlet opening 15a that varies inversely with the supply pressure at the inlet opening 14a. In this respect, the same family of curves 44 shown in FIG. 4 are applicable equally to the device 10a and the device 10, and the various curves represent changes in the volumetric flow that can be attained by selecting springs 36a and 38a having different biasing-force ratios. Since the modified device 10a is otherwise similar in structure and function to the device 10, no further description will be provided.

A further modified flow control device is illustrated in FIGS. 5 and 6, and again because of the essential identity between this modified device and the device 10 heretofore described in detail, the same numerals with the suffix b added thereto are used in FIGS. 5 and 6 to identify the respectively corresponding parts and components of the modified device 10b. The difference between the device 10b and the device 10 is that the former is equipped with adjustable control or regulation over the fluid flows both entering the device via the inlet opening 14b and leaving the same via the outlet opening 15b. The regulatory means employed in the specific device 10b being considered takes the form of needle valves which results in a relatively fine adjustment over the entering and exiting fluid flows.

Figure 5:
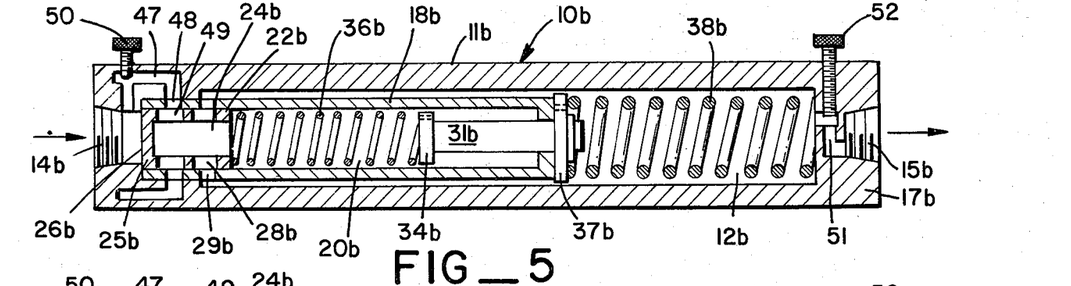
FIGS. 5 and 6 are each longitudinal sectional views taken along the axis of a further modified flow control device, generally similar to the device illustrated in FIGS. 1 and 2, but with means being associated with the inlet and outlet openings of the device to enable the orifice sizes to be selectively varied to change the flow characteristics through the device, FIGS. 5 and 6 respectively depicting the components of the device in the normal-pressure and abnormal-pressure positions thereof.
Figure 6:
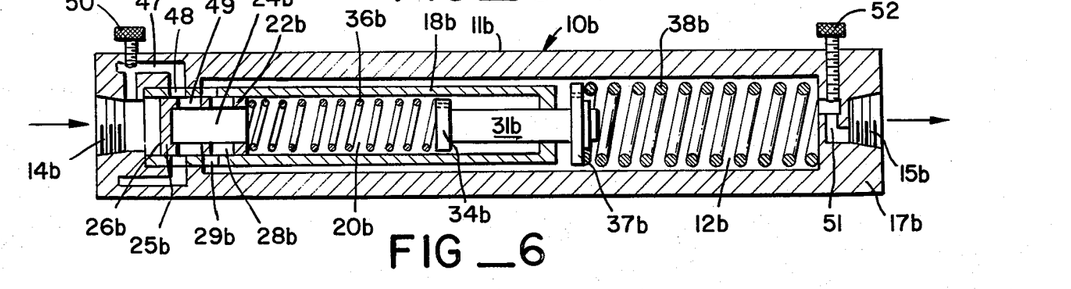

In more particular terms, the casing 11b adjacent the inlet opening 14b is provided with a passageway 47 communicating at one end with the opening 14b and at its other end terminating adjacent the sleeve 18b and communicating with an orifice or port 48 in the side wall thereof. The piston 22b has a relatively large port 49 in registration with the port 48 so that fluid can flow from the inlet opening 14b, through the passageway 47, through the ports 48 and 49, and into the central bore or opening 24b in the piston 22b. It will be observed that the end wall 25b does not have an opening therein so that the pressurizable surface 26b of such end wall is totally effective to have a pressure force developed thereagainst. An adjustable needle valve 50 is threadedly received within an opening provided therefore in the casing 11b, and the stem of such needle valve enters the passageway 47 to restrict the same to various degrees in accordance with the particular setting of the needle valve.

In a somewhat analagous manner, the casing 11b is also provided with a passageway 51 establishing communication between the chamber 12b and outlet opening 15b, and the casing is provided with a threaded opening that receives a needle valve 52 having a stem that enters the passageway 51 and is effective to restrict the same in varying degrees in response to the particular adjustment of the valve. Accordingly, the fluid flow through the passage 51 from the chamber 12b to outlet opening 15b is regulatively adjustable.

The modified device 10b functions in precisely the same manner as the device 10 heretofore explained, and it should be observed that the passageway 47 is in continuous communication with the central bore 24b in the piston 22b irrespective of the contemporaneous position of the piston because of the relatively large port 49 which maintains registration with the port 48 in the sleeve 18b throughout the entire range of axial displacements of the piston. Variations or changes in the response of the device 10b are effected by adjustment of the needle valve 50 which, because of its adjustability, provides a variable control over the pressure drop developed between the pressure at the inlet opening 14b which acts against the piston 22b in one direction and the pressure within the bore 24b and compartment 20b which acts against the piston 22b in the opposite direction. In this respect, the more restricted the passage 47, the greater will be the pressure drop occurring between the exterior and interior of the piston 22b. Similarly, the position of the needle valve 52 establishes the pressure drop developed across the passageway 51 and, therefore, the characteristics of the fluid flow from the chamber 12b to the outlet 15b can be tailored to meet the requirements of any particular environmental setting for the device.

Figure 7:
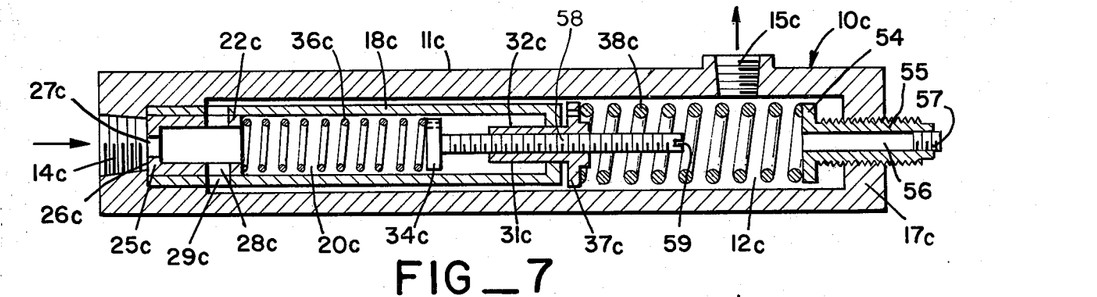
FIGS. 7 and 8 are each longitudinal sectional views taken along the axis of still another modified embodiment of the invention in which adjustments are incorporated to vary the magnitudes of the spring forces incorporated in the device, FIGS. 7 and 8 respectively depicting the component parts in the normal-pressure and adnormal-pressure position thereof.
Figure 8:
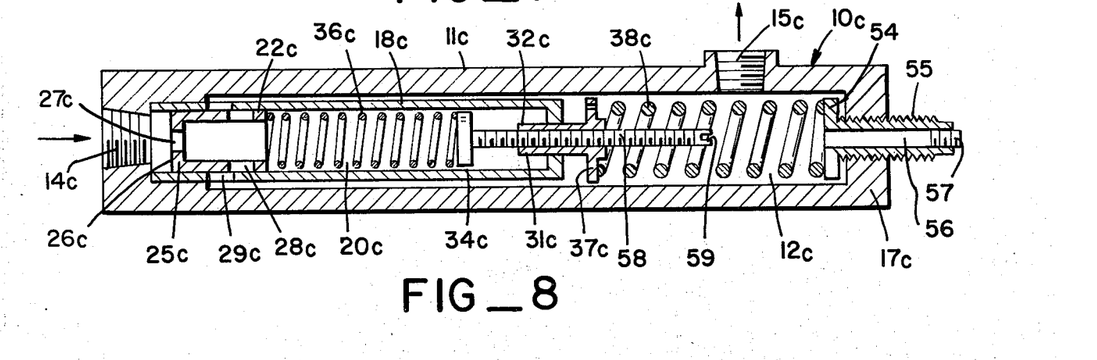

A still further modified flow control device is illustrated in FIGS. 7 and 8, and the general structural and functional identity of the modified device of FIGS. 7 and 8 permits use of the same numerals used with the device 10 to identify respectively corresponding parts and components except that the suffix letter c is added to each numeral in FIGS. 7 and 8 for purposes of differentiation. The essential difference between the modified device 10c and the device 10 is that means are incorporated in the former to selectively adjust the biasing forces of the springs 36c and 38c so that the preloads developed thereby can be varied conveniently and easily to meet the particular requirements of any use of the device.

It will be noted in FIGS. 7 and 8 that the modified device 10c has the outlet opening 15c thereof displaced from the end wall of the casing 11c to the side wall thereof. Nevertheless, the outlet opening 15c communicates directly with the chamber 12c to enable fluid to flow therefrom without restriction. Such location of the outlet opening 15c in the side wall of the casing structure 11c accommodates adjustment of a seat structure 54 in the form of an annular flange having a diameter somewhat less than that of the chamber 12c so as to be freely movable axially therealong. The seat structure is provided with an elongated hollow stem 55 that is threadedly received within an opening provided therefor in the end wall 17c of the casing structure. The stem 55 provides an elongated passage or bore 56 therethrough used to afford access to an adjustment for the spring 36c. The passage 56 is sealingly closed by a removable plug 57.

It is evident in FIGS. 7 and 8 that the helical compression spring 38c bears at one end thereof against the adjustable seat structure 54 and at its opposite end against the axially reciprocable element 37c. Since the seat structure 54 is axially adjustable relative to the casing 11c, it will be evident that the preload or biasing force of the spring 38c developed against the element 37c is selectively variable by rotating the stem 55 inwardly or outwardly relative to the casing 11c to change the axial position of the seat structure 54, thereby increasing or decreasing, as the case may be, the primary or initial biasing force of the spring 38c.

The spring seat element 34c is carried by the stem 32c of the spring seat structure 31c for axial displacements thereof relative to the sleeve 18c, as previously explained. However, the element 34c is equipped with an elongated shank 58 that is externally threaded and extends through and engages internal threads provided in the stem 32c which is hollowed and threaded for that purpose. At its remote end, the threaded shank 58 is provided with a slot 59 adapted to seat a screwdriver therein by means of which the shank can be rotated to displace the seat element 34c relative to the stem 32c and thereby vary the preload or initial biasing force of the helical compression spring 36c which at one end thereof bears against the seat element 34c.

It will be apparent that the control response provided by the device 10c can be varied to meet the requirements of any environmental setting for the device by selectively changing the biasing force provided by the spring 36c and/or the spring 38c. The preload applied by the spring 36c against the reciprocable piston 22c can be increased by displacing the seat element 34c inwardly relative to the sleeve 18c toward the inlet opening 14c, and it can be decreased by displacing the seat element 34c in the opposite direction toward the outlet opening 15c. Access to the screwdriver slot 59 in the threaded shank 58 is attained by removing the plug 57 in the hollow stem 55 and passing a screwdriver through the bore 56. Analagously, the preload developed by the spring 38c can be increased or decreased, as desired, by displacing the element 54 either toward the inlet opening 14c or toward the casing end wall 17c. The results attained by changing the spring forces has been described hereinbefore.

Figure 9:
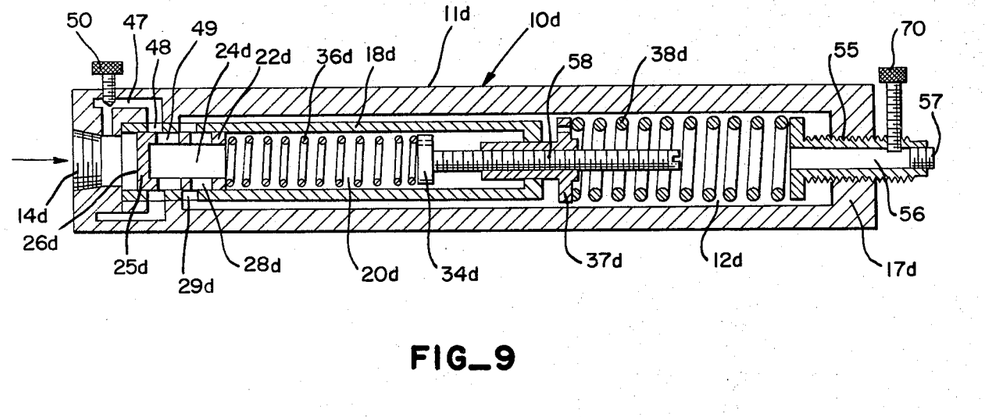

In all embodiments of the control device, the function is the same as respects its automatic regulation of the volumetric flow in response to pressure changes. It will be understood that the variant forms of the invention respectively illustrated in FIGS. 3, 5 through 6, and 7 through 8 may be all incorporated in a single device wherever it may be advantageous to do so. As shown in FIG. 9, the spring-force adjustment means 55 and 58 may be used in combination with flow adjustment means 50 and 70. The device illustrated may be constructed without one of the springforce adjustment means 55 and 58 and/or without one of the flow adjustment means 50 and 70.

By way of indicating the rate of change in fluid flow in terms of a typical forklift application, such vehicle might have a fork that is vertically displaceable at a rate of 50 feet per minute under no-load conditions. The device 10 incorporated in the hydraulic lift system can reduce the rate of fork travel along a generally straight-line curve in proportion to the magnitude of the load imposed on the fork to about 25 feet per minute at a load of 4,000 pounds passing through intermediate displacement rates of approximately 43 F.P.M. at 1,000 pounds; 38 F.P.M. at 2,000 pounds; and 33 F.P.M. at 3,000 pounds.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. A flow control device operative to change the volumetric flow of a fluid therethrough in inverse relation to changes from a predetermined norm in the supply pressure of such fluid, comprising: casing structure defining an axially extending chamber therein having both an inlet opening and an outlet opening communicating therewith, and further having a flow control port interposed in a flow path relationship with said inlet and outlet openings and communicable with each; flow adjustment means interposed in the flow path intermediate said chamber and each of said inlet and outlet openings to regulate the flow of fluid through said device and pressure drop thereacross; said flow adjustment means comprising: a piston axially reciprocable within said chamber generally between normal-pressure and abnormal-pressure positions in traversing relation with said flow control port, and having an end wall providing surface areas disposed in pressure-receiving relation with said inlet opening to have a pressure force developed thereagainst; a spring seat structure axially reciprocable within said chamber generally between normal-pressure and abnormal-pressure positions and having a pressurizable surface spaced from said piston and forming a pressurizable space therewith communicable with said inlet opening and being disposed in facing relation with said piston to enable a pressure force to develop therebetween urging the piston and seat structure in opposite axial directions; spring structure biasing said seat structure toward the normal-pressure position thereof; and spring means operative between said seat structure and piston to bias the latter toward the normal-pressure position thereof.

2. The device of claim 1 in which said piston is generally hollow and has a flow port opening registerable with the aforesaid flow control port to enable fluid to flow through the hollow interior of said piston in moving from said inlet opening to said outlet opening.

3. The device of claim 2 in which said casing structure includes an axially extending sleeve supported within said chamber in spaced relation with the walls thereof to define a flow space therebetween, said spring seat structure being supported for reciprocable displacements by said sleeve, and the aforesaid pressurizable space intermediate said spring seat structure and piston being located within said sleeve.

4. The device of claim 3 in which said piston is generally hollow and has a flow port opening registerable with the aforesaid flow control port to enable fluid to flow through the hollow interior of said piston in moving from said inlet opening to said outlet opening, and in which said casing structure includes an axially extending sleeve supported within said chamber in spaced relation with the walls thereof to define a flow space therebetween, said spring seat structure being supported for reciprocable displacements by said sleeve, and the aforesaid pressurizable space intermediate said spring seat structure and piston being located within said sleeve.

5. The device of claim 4 in which said sleeve is spaced from the outlet end of said chamber and said spring structure is disposed intermediate said sleeve and casing, said spring means being located within said sleeve.

6. The device of claim 1 and further including manually adjustable spring-force adjustment means connected with one of said spring structure and spring means to vary the magnitude of the preload biasing force imparted thereby.

7. The device of claim 6 in which spring-force adjustment means are provided in connection with each of said spring structure and spring means to provide selective adjustment of the biasing force imparted thereby.

8. The device of claim 6 and further including flow adjustment means interposed in the flow path intermediate said chamber and one of said inlet and outlet openings to regulate the flow of fluid through said device and pressure drop thereacross.

9. The device of claim 8 in which flow adjustment means are arranged with each of said inlet and outlet openings, in which spring-force adjustment means are provided in connection with each of said spring structure and spring means to provide selective adjustment of the biasing force imparted thereby.

10. The device of claim 6 in which said piston is generally hollow and has a flow port opening registerable with the aforesaid flow control port to enable fluid to flow through the hollow interior of said piston in moving from said inlet opening to said outlet opening, and in which said casing structure includes an axially extending sleeve supported within said chamber in spaced relation with the walls thereof to define a flow space therebetween, said spring seat structure being supported for reciprocable displacements by said sleeve, and the foresaid pressurizable space intermediate said spring seat structure and piston being located within said sleeve.

11. The device of claim 10 in which said sleeve is spaced from the outlet end of said chamber and said spring structure is disposed intermediate said sleeve and casing, said spring means being located within said sleeve.

12. A flow control device operative to change the volumetric flow of a fluid therethrough in inverse relation to changes from a predetermined norm in the supply pressure of such fluid comprising: casing structure defining an axially extending chamber therein having both an inlet opening and an outlet opening communicating therewith, and further having a flow control port interposed in a flow path relationship with said inlet and outlet openings and communicable with each, said casing structure further including an axially extending sleeve located within said chamber and being spaced from the walls thereof to provide a flow path therebetween; a piston axially reciprocable within said chamber generally between normal-pressure and abnormal-pressure positions in traversing relation with said flow control port and having an end wall providing surface areas disposed in pressure-receiving relation with said inlet opening to have a pressure force developed thereagainst; a spring seat structure axially reciprocable within said chamber generally between normal-pressure and abnormal-pressure positions and having a pressurizable surface spaced from said piston and forming a pressurizable space therewith communicable with said inlet opening and being disposed in facing relation with said piston to enable a pressure force to develop therebetween urging the piston and seat structure in opposite axial directions, said spring seat structure being provided with a collar disposed in radially spaced and substantially circumjacent relation with said sleeve and extending therealong; spring structure biasing said seat structure toward the normal pressure position thereof, said spring structure also being located in circumjacent relation with said sleeve and collar, such that certain of the components of said device are disposed in structural parallelism to reduce the overall length of said device; and spring means operative between said seat structure and piston to bias the latter toward the normal-pressure position thereof.

* * * * *